(12) United States Patent
Cartwright et al.

(10) Patent No.: US 9,628,630 B2
(45) Date of Patent: Apr. 18, 2017

(54) METHOD FOR IMPROVING PERCEPTUAL CONTINUITY IN A SPATIAL TELECONFERENCING SYSTEM

(71) Applicant: Dolby Laboratories Licensing Corporation, San Francisco, CA (US)

(72) Inventors: Richard J. Cartwright, Killara (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/430,841

(22) PCT Filed: Sep. 25, 2013

(86) PCT No.: PCT/US2013/061648
§ 371 (c)(1),
(2) Date: Mar. 24, 2015

(87) PCT Pub. No.: WO2014/052431
PCT Pub. Date: Apr. 3, 2014

(65) Prior Publication Data
US 2015/0244868 A1    Aug. 27, 2015

Related U.S. Application Data

(60) Provisional application No. 61/706,315, filed on Sep. 27, 2012.

(51) Int. Cl.
*H04M 3/56* (2006.01)
(52) U.S. Cl.
CPC ........... *H04M 3/561* (2013.01); *H04M 3/569* (2013.01); *H04M 2203/5072* (2013.01)
(58) Field of Classification Search
CPC ........ H04M 3/561; H04M 3/567; H04M 3/56; H04M 7/006; H04M 3/569
See application file for complete search history.

(56) References Cited

U.S. PATENT DOCUMENTS

| 4,648,108 A | 3/1987 | Ellis |
| 5,647,008 A | 7/1997 | Farhangi |

(Continued)

FOREIGN PATENT DOCUMENTS

| EP | 1855455 | 11/2007 |
| WO | 03/039069 | 5/2003 |

(Continued)

OTHER PUBLICATIONS

Yang, D. et al. "Progressive Syntax-Rich Coding of Multichannel Audio Sources" EURASIP Journal on Applied Signal Processing, vol. 2003, Jan. 2003, pp. 980-992.

(Continued)

*Primary Examiner* — Andrew Lee

(57) ABSTRACT

The present document relates to audio conference systems. In particular, the present document relates to improving the perceptual continuity within an audio conference system. According to an aspect, a method for multiplexing first and second continuous input audio signals is described, to yield a multiplexed output audio signal which is to be rendered to a listener. The first and second input audio signals (123) are indicative of sounds captured by a first and a second endpoint (120, 170), respectively. The method comprises determining a talk activity (201, 202) in the first and second input audio signals (123), respectively; and determining the multiplexed output audio signal based on the first and/or second input audio signals (123) and subject to one or more multiplexing conditions. The one or more multiplexing conditions comprise: at a time instant, when there is talk activity (201) in the first input audio signal (123), determining the multiplexed output audio signal at least based on the first input audio signal (123); at a time instant, when there is talk activity (202) in the second input audio signal (123), determining the multiplexed output audio signal at least based on the second input audio signal (123); and at a silence (Continued)

time instant, when there is no talk activity (201, 202) in the first and in the second input audio signals (123), determining the multiplexed output audio signal based on only one of the first and second input audio signals (123).

21 Claims, 8 Drawing Sheets

(56) References Cited

U.S. PATENT DOCUMENTS

| | | | |
|---|---|---|---|
| 6,230,130 | B1 | 5/2001 | Castello Da Costa |
| 7,006,617 | B1 | 2/2006 | Dal Farra |
| 7,079,838 | B2 | 7/2006 | Thomas |
| 7,191,126 | B2 | 3/2007 | Tasaki |
| 7,428,223 | B2 | 9/2008 | Nierhaus |
| 7,453,826 | B2 | 11/2008 | Wildfeuer |
| 8,111,820 | B2 | 2/2012 | O'Malley |
| 2003/0063574 | A1* | 4/2003 | Virolainen ............ H04M 3/561 370/260 |
| 2003/0198195 | A1* | 10/2003 | Li ............................ H04M 3/56 370/260 |
| 2004/0264473 | A1* | 12/2004 | Chen .................. H04L 12/5693 370/395.4 |
| 2005/0088514 | A1* | 4/2005 | Deleam ............... H04L 12/1827 348/14.08 |
| 2005/0286664 | A1* | 12/2005 | Chen ................ H04L 29/06027 375/349 |
| 2006/0019655 | A1* | 1/2006 | Peacock ................ H04W 92/02 455/426.1 |
| 2007/0274540 | A1 | 11/2007 | Hagen |
| 2008/0004729 | A1* | 1/2008 | Hiipakka .................. H04R 5/04 700/94 |
| 2008/0159507 | A1* | 7/2008 | Virolainen .......... H04M 1/7253 379/202.01 |
| 2009/0299742 | A1* | 12/2009 | Toman ................ G10L 21/0272 704/233 |
| 2011/0112833 | A1* | 5/2011 | Frankel ................... G10L 15/32 704/235 |
| 2012/0224469 | A1* | 9/2012 | Erke ....................... H04L 12/14 370/221 |

FOREIGN PATENT DOCUMENTS

| | | |
|---|---|---|
| WO | 2014/046916 | 3/2014 |
| WO | 2014/046923 | 3/2014 |
| WO | 2014/046944 | 3/2014 |

OTHER PUBLICATIONS

Martin, Rainer "Noise Power Spectral Density Estimation Based on Optimal Smoothing and Minimum Statistics" IEEE Transactions on Speech and Audio Processing, vol. 9, Issue 5, Jul. 2001, pp. 504-512.

Martin, Rainer "Spectral Subtraction Based on Minimum Statistics" in Proc. Euro. Signal Processing Conf. Jan. 1994, pp. 1182-1185.

\* cited by examiner

METHOD FOR IMPROVING PERCEPTUAL CONTINUITY IN A SPATIAL TELECONFERENCING SYSTEM

TECHNICAL FIELD

The present document relates to audio conference systems. In particular, the present document relates to improving the perceptual continuity within an audio conference system.

BACKGROUND

Audio conference systems allow a plurality of parties at a plurality of different terminals to communicate with one another. The plurality of terminals (which are also referred to as endpoints) may have different capabilities. By way of example, one or more terminals may be monophonic endpoints which capture a single mono audio stream. Examples for such monophonic endpoints are a traditional telephone, a device with a headset and a boom microphone, or a laptop computer with an in-built microphone. On the other hand, one or more terminals may be soundfield endpoints which capture a multi-channel representation of the soundfield incident at a microphone array. An example for a soundfield endpoint is a conferencing telephone equipped with a soundfield microphone (e.g. an array of microphones).

This document sets out a general framework and several embodiments for achieving a plausible and consistent spatial conference experience in use cases where there are multiple endpoints or sources, in particular endpoints of spatial audio capture. It has been observed that too many active soundfields can create undesirable noise and spatial scene background complexity. The present document proposes several approaches to achieving a sense of presence and immersion whilst avoiding an unnatural and dense layered soundfield. The goal of the mixing schemes described in the present document is to establish what is termed 'perceptual continuity', where the user experience is that of a reasonably consistent conference where transitions and unnatural shifts in the voice activity and spatial soundfield are reduced (and possibly minimized).

Specifically, this document provides several schemes for achieving the above stated goals. One approach of presenting a mixed or reduced soundfield is based on the selection and transitions between a limited number of component soundfields at any point in time. Using the methods described in the present document a sense of spatial presence may be maintained, e.g. by sustaining the mix output of a single soundfield related to the endpoint which has been most recently active and significant in the conference activity, even at moments where there is no significant conference activity.

SUMMARY

According to an aspect a method for multiplexing a first and a second continuous input audio signal is described, to yield a multiplexed output audio signal which is to be rendered to a listener. In other words, a method for multiplexing a plurality of continuous input audio signals is described, wherein the plurality of continuous input audio signals comprises a first and a second input audio signal. The first and second continuous input audio signals may be monophonic audio signals (from a monophonic endpoint) and/or soundfield audio signals (from a soundfield endpoint). In a similar manner, the multiplexed output audio signal may be a monophonic audio signal (to be rendered at a monophonic endpoint) and/or a soundfield audio signal (to be rendered at a soundfield endpoint). The method is particularly well suited for multiplexing at least one input soundfield audio signal with other input audio signals to yield a multiplexed output soundfield audio signal.

The first and second input audio signals may be indicative of sounds captured by a first and a second endpoint, respectively. In case of soundfield signals, the first and second input audio signals may be indicative of soundfields captured by a first and a second endpoint, respectively. The input audio signals may be continuous in the sense that a sound captured at a respective endpoint is continuously transmitted to the multiplexing point.

A soundfield signal may comprise a multi-channel audio signal indicative of a direction of arrival of a sound signal coming from a talker at the corresponding endpoint from which the soundfield signal originates. In particular, a first soundfield signal may comprise a first-order ambisonic input signal, wherein the first-order ambisonic input signal comprises an omnidirectional input channel and at least two directional input channels. The at least two directional input channels may be associated with at least two directions which are orthogonal with respect to one another.

The first and second input audio signals typically comprise a sequence of segments (also referred to as frames). The segments may have a pre-determined length of e.g. 20 ms. The multiplexing is typically performed in a time-variant manner. As such, the multiplexing may be performed on a segment-by-segment basis.

The first and second input signals may comprise respective ambient signal components and talker signal components. An ambient signal component typically results from background noise at the respective endpoint, and a talker signal component typically results from a person talking at the respective endpoint. Respective energies of the ambient signal components may exceed a pre-determined energy threshold (notably during silence periods). In other words, the ambient signal components may be significant. This is particularly the case for soundfield signals originating from soundfield endpoints upon which it may be desirable to minimize the amount of noise suppression performed, in order to maintain a natural sense of room ambience.

The method may comprise determining a talk activity in the first and second input audio signals, respectively. By way of example, the talk activity may be a binary indicator (e.g. a talk flag), indicating the presence or the absence of talk activity at a particular time instant (segment). The presence/absence of talk activity may be determined on a segment-by-segment basis. As such, for each time instant (or segment) it may be determined whether the first and/or second input audio signals comprise a talk activity or not. Determining the talk activity in an input audio signal may comprise analyzing metadata associated with the input audio signal. Such metadata may comprise the talk flag (sequence of talk flags for the sequence of segments) indicative of the talk activity in the input audio signal. Alternatively or in addition, determining the talk activity in an input audio signal may comprise performing voice activity detection on the input audio signal (e.g. using a voice activity detection algorithm).

The method may comprise determining the multiplexed output audio signal based on the first and/or second input audio signals. The determining may be subjected to a multiplexing condition (e.g. one or more multiplexing conditions), which may result from the combination of individual multiplexing conditions which are combined with one another in an "and" or "or" manner. The one or more individual multiplexing conditions may comprise a first condition which stipulates that at a time instant (or segment), when there is talk activity in the first input audio signal, the multiplexed output audio signal is determined at least based on the first input audio signal. A second condition stipulates that at a time instant (or segment), when there is talk activity in the second input audio signal, the multiplexed output audio signal is determined at least based on the second input audio signal. A third condition stipulates that at a silence time instant (or a silence segment), when there is no talk activity in the first and in the second input audio signals, the multiplexed output audio signal is determined based on only one of the first and second input audio signals. In a preferred embodiment, the first, second and third conditions are combined in an "and" manner to yield the multiplexing condition which the determining of the multiplexed output audio signal is subjected to. By doing this it is ensured that during periods of talk activity, an input audio signal is multiplexed into the output audio signal. On the other hand, during periods of silence, the number of input audio signals which are multiplexed into the output audio signal is reduced, thereby reducing the amount of background noise comprised within the multiplexed output audio signal.

It should be noted that the multiplexing condition may be determined by the combination of other conditions, notably the conditions outlined in the context of FIGS. 2 to 7 of the present document.

In an example implementation, the selective multiplexing of the input audio signals may be achieved by the application of respective gains prior to multiplexing. For this purpose, the method may comprise applying a first time-dependent gain to the first input audio signal, to yield a first weighted audio signal. In order to ensure that an active signal is audible, the first gain (in particular the absolute value thereof) may be greater than zero, at time instants when there is talk activity in the first input audio signal. In a similar manner, the method may comprise applying a second time-dependent gain to the second input audio signal, to yield a second weighted audio signal. The second gain (in particular the absolute value thereof) may be greater than zero, at time instants when there is talk activity in the second input audio signal. As such, the multiplexed output audio signal may be determined based on the first and second weighted audio signals. An input audio signal may be excluded from the multiplexed output audio signal by putting its gain to substantially zero. For audio signals which comprise sequences of segments, the gains may be updated on a segment-by-segment basis.

If it is determined that, at the silence time instant (e.g. for the silence segment), the first input audio signal comprises a talk activity at a time instant (or segment) which is more recent than a time instant of a last talk activity in the second input audio signal, then the second gain may be substantially zero (at the silence time instant). On the other hand, the first gain (at the silence time instant) may be greater than zero. As such, it may be ensured that the background noise of the most recent talker is multiplexed into the output audio signal, thereby increasing a perceived continuity of an audio conference. On the other hand, by multiplexing at least one input audio signal into the output audio signal (even in situations of silence within the audio conference), the perceived continuity may be increased (because the listener is always provided with some kind of background noise, which informs the listener that the audio conference is still ongoing).

At a time instant (or for a segment), when there is talk activity in the second input audio signal and no talk activity in the first input audio signal, the first gain may be substantially zero. This means that during time periods with at least one input audio signal which exhibits talk activity, the input audio signals which do not exhibit talk activity may be excluded from the multiplexed output audio signal, thereby reducing the overall background noise within the audio conference.

The first input audio signal may be a first soundfield signal indicative of a soundfield captured by the first endpoint. On the other hand, the second input audio signal may be a monophonic signal. In such cases, at the silence time instant, the second gain may be (set to) substantially zero (and the first gain may be greater than zero). In other words, in silence situations, it may be preferable to multiplex a soundfield signal into the output audio signal, rather than a monophonic signal, thereby ensuring that the ambience provided by a soundfield is maintained within the output audio signal.

At all time instants, when there is no talk activity in the first and in the second input audio signals, only one of the first and the second input audio signals may be used to determine the multiplexed output audio signal. In other words, the multiplexing condition may be further restricted by imposing that at any silence time instant, only one of the first and the second input audio signals are multiplexed into the output audio signal, thereby reducing the amount of background noise comprised within the output audio signal.

The method may comprise determining a second silence time interval ranging from a time instant of the last talk activity in the second input audio signal up to a current time instant. The second gain may be maintained greater than zero, if the second silence time interval is smaller than a pre-determined hold time interval. In other words, even though the second input audio signal does not represent the most recent talker (because the first input audio signal represents a more recent talker), the second input audio signal may be multiplexed into the output audio signal for at least a hold time interval subsequent to the time instant of the to last talk activity. By using such hold time intervals, an excessive amount of switching between different input audio signals may be reduced, when determining the multiplexed output audio signal. This leads to an increased degree of perceived continuity for the listener.

The method may further comprise determining that the second silence time interval is greater than the hold time interval. In such cases, the second gain may be reduced progressively within a fade-out time interval subsequent to the hold time interval. In other words, as an additional condition, it may be verified whether the time interval of no talk activity of the second input audio signal exceeds the hold time interval. If this is the case, the second input audio signal may be faded-out, thereby reducing audible artifacts caused by abrupt switching or cut-off of the second input audio signal.

The method may further comprise determining a resumption of talk activity in the second input audio signal at a second time instant, wherein the second time instant is subsequent to the silence time instant. As a result of this condition, the second gain may be set to a value greater than zero, i.e. the second input audio signal may be multiplexed into the output audio signal. On the other hand, the first gain may be set to substantially zero, in particular, if the first input audio signal still does not comprise a talk activity. A further condition for excluding the first input audio signal from being multiplexed to the output audio signal may be that the first input audio signal is a monophonic audio signal. If the first input audio signal is a soundfield signal and if the second audio signal is a monophonic signal, the first gain may nevertheless be maintained greater zero. By doing this, it can be ensured that the multiplexed output audio signal always comprises the ambience component of at least one soundfield signal. This is particular important if the output audio signal is a soundfield signal, as this allows the rendering of a spatial ambience component (thereby ensuring a perceptual continuity of the audio conference).

The method may further comprise determining a resumption of talk activity in the second input audio signal at a second time instant; wherein the second time instant is subsequent to the silence time instant. As a result of this condition, the second gain may be set to a value greater than zero, i.e. the second input audio signal may be multiplexed into the output audio signal. On the other hand, the first gain may be maintained greater than zero, even if the first input audio signal is a monophonic audio signal. The first gain may be maintained greater than zero for the hold time interval starting from the second time instant, thereby reducing excessive switching within the audio conference. Subsequently, the first gain may be set to substantially zero or may be faded-out over a fade-out time interval, thereby reducing the amount of background noise within the audio conference.

The method may further comprise determining a first and a second verbosity for the first and second input audio signals, respectively. The first and second verbosities may be indicative of a degree of talk activity in a recent evaluation time interval in the first and second input audio signals, respectively. In other words, the verbosity may be indicative of the amount of talk activity comprised within an input audio signal within a period of time prior to a current time instant. The verbosity may be updated on a segment-by-segment basis, in order to take into account changes in the degree of talk activity. The verbosity may be increased if there currently is talk activity, and the verbosity may be decreased if there is currently no talk activity. The verbosity may be viewed as an accumulated version of the instantaneous talk activity. By way of example, the verbosity may be determined by low pass filtering (or by averaging) the instantaneous talk activity over an evaluation time interval prior to the current time instant.

Having determined the first and second verbosities, the multiplexed output audio signal may be determined also based on the first and/or second verbosities. In particular, the multiplexing condition may depend on the first and/or second verbosities. In particular, the multiplexing condition may comprise one or more conditions with respect to the first and/or second verbosities.

In an implementation, the first and second gains may be determined based on the first and second verbosities, respectively. In particular, the first and second gains may be determined based on the first and second verbosities at time instants when there is no talk activity in the first and second input audio signals, respectively. At such time instants, the first and second gains may be proportional to the first and second verbosities, respectively. By doing this, a verbosity-dependent fade-out of an input audio signal from the multiplexed output audio signal may be implemented, thereby ensuring that the ambience perceived by the listener has a high degree of continuity. In particular, it can be ensured that the ambience perceived during talk activity is similar to the ambience perceived in the absence of talk activity.

Alternatively or in addition, the verbosity may be used to control an overall level of background noise. By way of example, it may be imposed that, at a current time instant (e.g. for all time instants), a sum of the gains applied to all of the input audio signals which contribute to the multiplexed output audio signal is limited to a total gain (e.g. of 1.5). The total gain may be distributed to the different input audio signals based on their verbosities. In particular, at the current time instant (e.g. for all time instants), the first and second gains may correspond to respective fractions of the total gain, and the respective fractions of the total gain may depend on the first and second verbosities at the current time instant.

The method may further comprise applying noise suppression to the first input audio signal, using a first noise suppression profile. In a similar manner, noise suppression may be applied to the second and other input audio signals. The first noise suppression profile may depend on the first verbosity. In a similar manner, the noise suppression profiles of the other input audio signals may depend on verbosities of the other input audio signals, respectively. By doing this, input signals having a relatively low verbosity may be submitted to relatively higher noise suppression (and vice versa), thereby reducing the overall level of the background noise and thereby ensuring that the ambience perceived by the listener is adjusted to the most active input audio signal(s).

The method may comprise determining a default noise suppression profile based on the first input audio signal and scaling the default noise suppression profile based on the first verbosity to yield the first noise suppression profile. As such, the degree and the amount of noise suppression may be controlled by the verbosity.

According to a further aspect, a conference multiplexer is described which is configured to multiplex first and second continuous input audio signals to yield a multiplexed output audio signal which is to be rendered to a listener. The first and second input audio signals may be indicative of sounds captured by a first and a second endpoint, respectively. The conference multiplexer may be configured to determine a talk activity in the first and second input audio signals, respectively. Furthermore, the conference multiplexer may be configured to determine the multiplexed output audio signal based on the first and/or second input audio signals. The determining may be subjected to a multiplexing condition. The multiplexing condition may comprise one or more of the following individual multiplexing conditions: At a time instant, when there is talk activity in the first input audio signal, the multiplexed output audio signal may be determined at least based on the first input audio signal. At a time instant, when there is talk activity in the second input audio signal, the multiplexed output audio signal may be determined at least based on the second input audio signal. At a silence time instant, when there is no talk activity in the first and in the second input audio signals, the multiplexed output audio signal may be determined based on only one of the first and second input audio signals.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF THE FIGURES

The invention is explained below in an exemplary manner with reference to the accompanying drawings, wherein.

DETAILED DESCRIPTION OF THE INVENTION

Figure 1A:
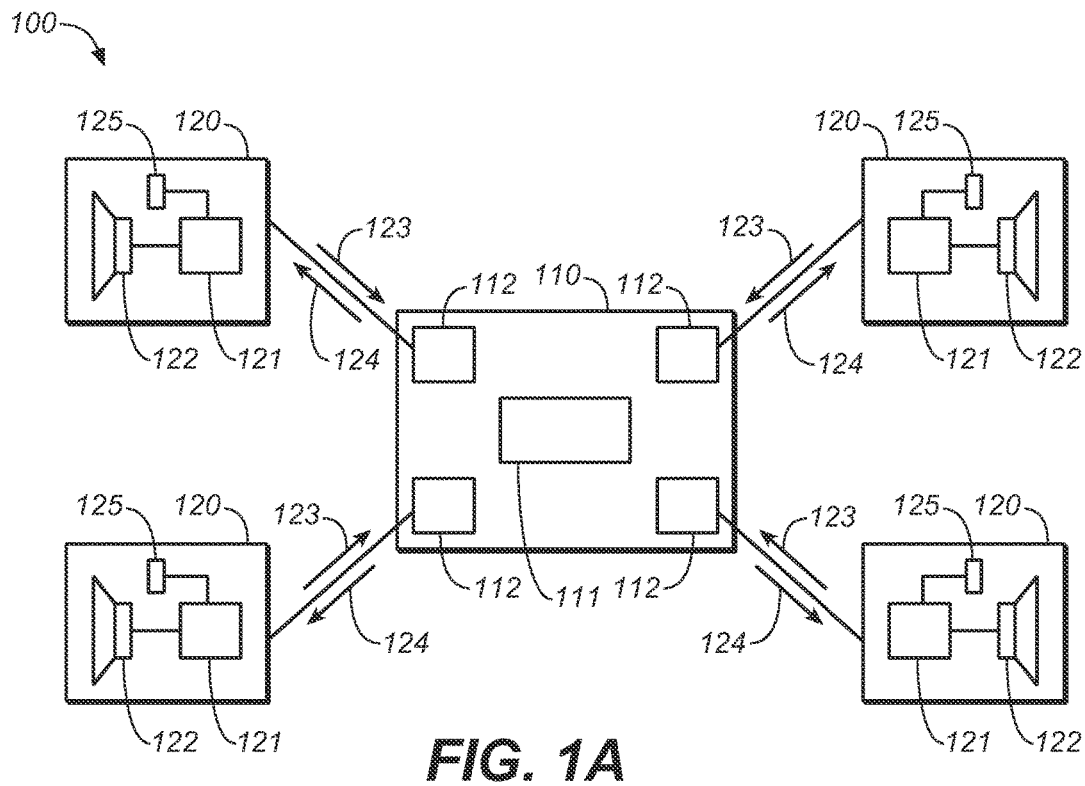
FIG. 1a shows a block diagram of an example centralized audio conference system.
Figure 1B:
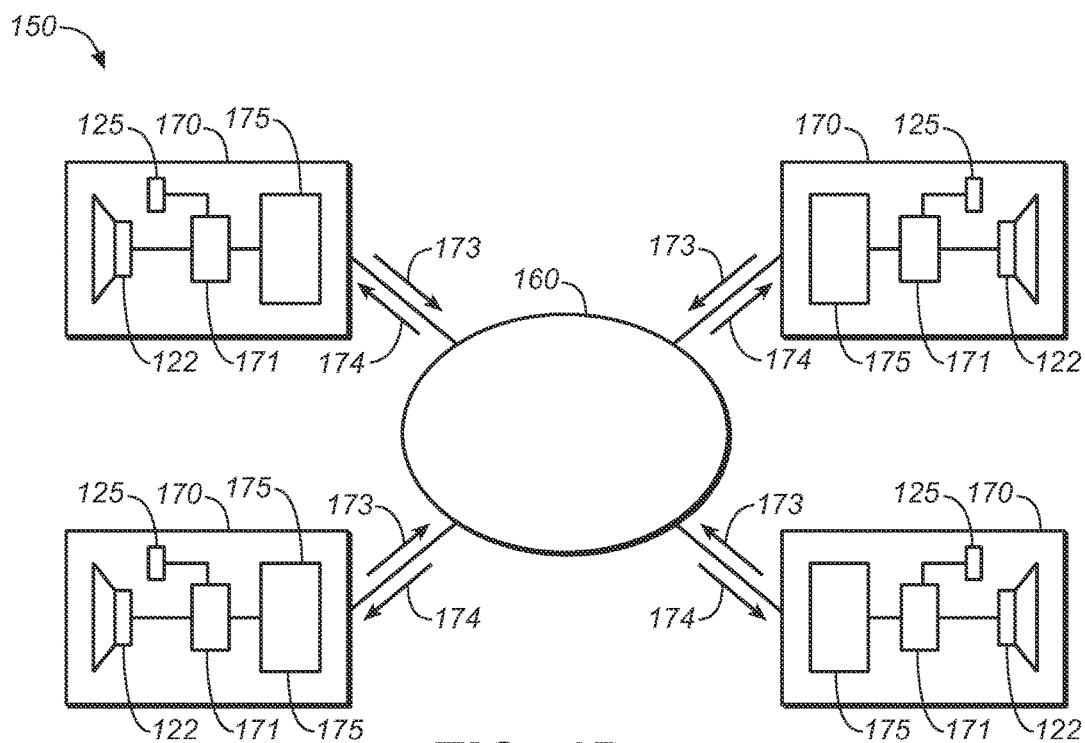
FIG. 1b shows a block diagram of an example decentralized audio conference system.
Figure 1C:
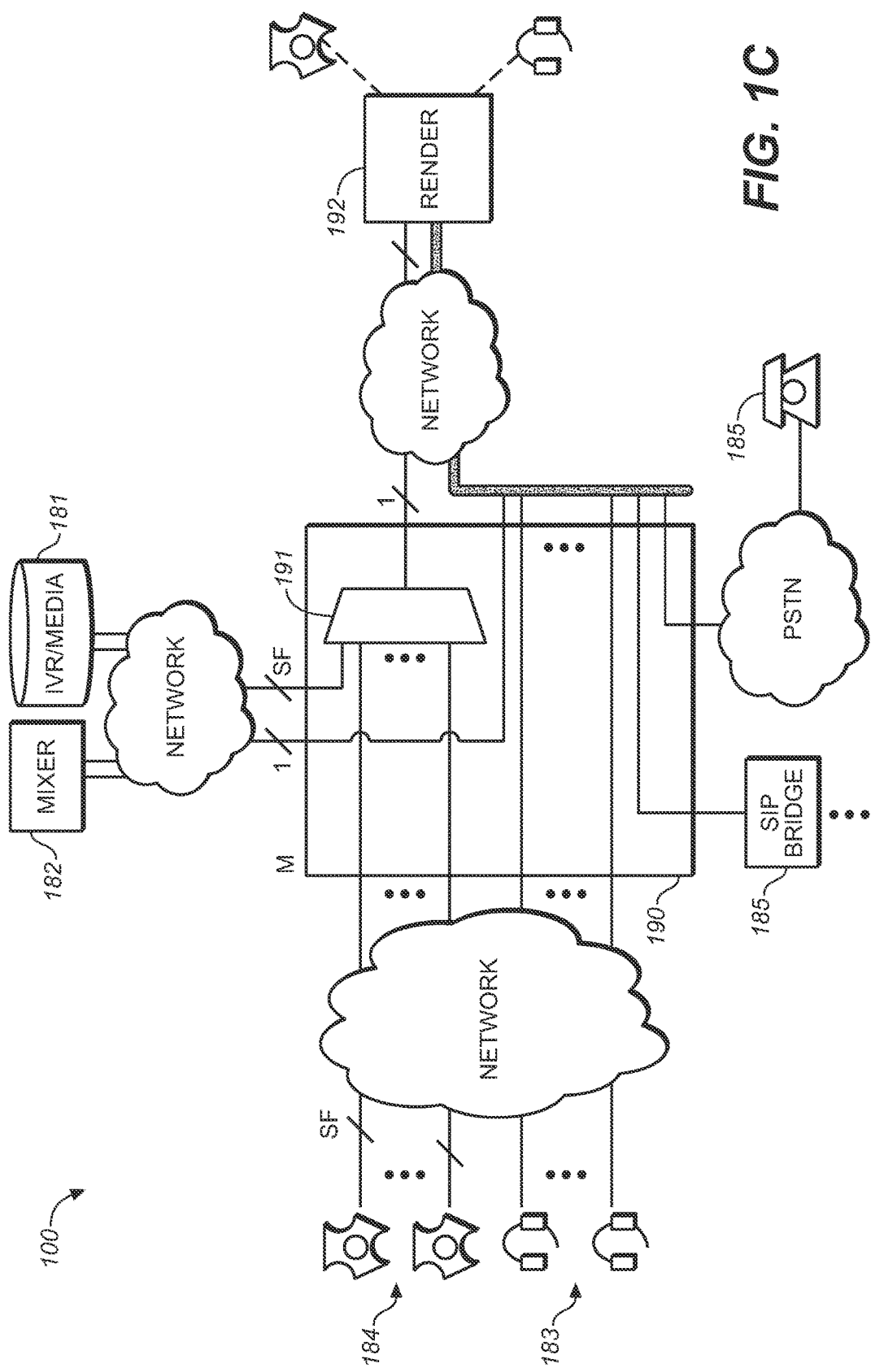
FIG. 1c illustrates a block diagram of an example audio conference system comprising a soundfield mixing function.

The present document deals with a voice conferencing system (e.g. voice conferencing systems as illustrated in FIGS. 1a, 1b and 1c), in which multiple endpoints are involved in a conference, and wherein some of these endpoints may have spatial sound capabilities. The present document is particularly interested in creating the output render and audio scene for an endpoint that has e.g. a spatial audio output capability. At the input, each endpoint may have a soundfield input or a monophonic input. A soundfield endpoint is an endpoint that captures a multi-channel representation of the soundfield incident at its microphone array (e.g. a conferencing telephone equipped with a soundfield microphone). A monophonic endpoint captures a single audio stream (e.g. a traditional telephone, a device with a headset with boom microphone, or a laptop computer with inbuilt microphone).

The methods described in the present document apply particularly well to multi-party communication systems that may have multiple spatial endpoints that are simultaneously sending audio to the server. When more than two soundfield endpoints are connected via a conferencing server in such a system a mixing/multiplexing question arises. How to integrate multiple soundfields together so that a listener enjoys a perceptually continuous, natural, enveloping voice conferencing experience in which he/she can clearly understand the speech, can identify who is talking at any particular time and can identify at which endpoint each talker is located?

There are various schemes for combining soundfields or spatial audio inputs into an overall conference scene. Such schemes make use e.g. of spatial multiplexing of a plurality of soundfields. It may not generally be desirable to have all potential spatial sound sources continuously mixed for a large number of participant endpoints. Hence, it may be preferable to perform a selection, a modification and/or an appropriate mixing of the soundfields or the spatial audio inputs. This may be referred to as the 'multiplexing' of soundfields or of the spatial audio inputs. As a result, a listener experiences some selectively combined or 'multiplexed' version of the potential spatial sound sources.

The concept of 'temporal multiplexing' is used to refer to a system in which different soundfields and/or monophonic input signals are heard by the listener from time to time, or in which soundfields and/or monophonic input signals are mixed together with time-varying gains. The present document focuses on such temporal multiplexing schemes. It is noted that the temporal multiplexing schemes described in the present document may be combined with other multiplexing methods (e.g. the once described in the above mentioned patent applications) to create a wide range of soundfield/monophonic multiplexing strategies.

FIG. 1a illustrates an example multi-party audio conference system 100 with a centralized architecture. A centralized conference server 110 receives a plurality of upstream audio signals 123 from a respective plurality of terminals 120. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG4 audio bitstream. In case of a monophonic terminal 120, the upstream audio signal 123 is typically a mono audio signal. In case of a soundfield terminal 120, the upstream audio signal 123 may be a multi-channel audio signal (e.g. a 5.1 or a 7.1 multi-channel audio signal). Alternatively, the upstream audio signal 123 may be an ambisonic signal, e.g. a first-order ambisonic signal which is also referred to as a B-format signal. In the first-order ambisonic sound format sound information is encoded into four channels: W, X, Y and Z. The W channel is a non-directional mono component of the signal, corresponding e.g. to the output of an omni-directional microphone of the soundfield endpoint 120. The X, Y and Z channels are the directional components in three orthogonal dimensions. The X, Y and Z channels correspond e.g. to the outputs of three figure-of-eight microphones, facing forward, to the left, and upward respectively (with respect to the head of a listener). A first-order horizontal ambisonic signal comprises the W, X, and Y components.

In the present document, the components W, X, and Y may be used to represent a multi-channel audio object or soundfield in the sense that it represents an acoustical situation that was, or could have been captured by a set of microphones, and describes the signal properties of the soundfield over space, time and frequency around a central location. Such signals can be linearly transposed or transformed to other spatial representations. Furthermore, any audio signal can be transformed between domains such as time and frequency or subband representation. For the purpose of this disclosure, the components W, X, Y are generally used to refer to a soundfield object that is either captured or created, such as through manipulations presented in this document. It is noted that the aspects described in the present document can be extended beyond first order horizontal soundfield representation, and could be applied to spatial formats with larger numbers of channels (higher order) and also periphonic (azimuth and elevation) capture of the soundfield.

It should be noted that soundfields may be encoded and transported across a communication system. An encoding and layering scheme for soundfields (in particular for first-order ambisonic audio signals) is describe e.g. in U.S. Application Nos. 61/703,857 and 61/703,855, the disclosures of which are incorporated by reference.

The centralized conference server 110 (e.g. the audio servers 112 comprised within the conference server 110) may be configured to decode and to process the upstream audio streams (representing the upstream audio signals 123), including optional metadata associated with upstream audio streams. The upstream audio signals 123 are also referred to herein as the input audio signals. The metadata may e.g. comprise talk flags which indicate time instants or segments/frames of talk activity within an upstream audio signal 123. Furthermore, the metadata may comprise a (time and/or frequency variant) noise suppression profile for the upstream audio signal 123.

The conference server 110 may e.g. be an application server of an audio conference service provider within a telecommunication network. The conference server 110 may be configured to perform the temporal multiplexing strategies described in the present document. The conference server 110 comprises a central conference controller 111 configured to combine the plurality of upstream audio signals 123 to form an audio conference. The central conference controller 111 may be configured to place the plurality of upstream audio signals 123 at particular locations (also referred to as talker locations) within a 2D or 3D conference scene and to generate information regarding the arrangement (i.e. the locations) of the plurality of upstream audio signals 123 within the conference scene. Alternatively or in addition, the central conference controller 111 may be configured to perform temporal multiplexing (as described in the present document).

Furthermore, the conference server 110 comprises a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), as well as the information regarding the arrangement of the plurality of upstream audio signals 123 within the conference scene and/or information regarding the temporal multiplexing of the plurality of upstream audio signals 123. Using this information, the audio server 112 generates a set of downstream audio signals 124, and/or corresponding metadata, which is transmitted to the respective terminal 120, in order to enable the respective terminal 120 to render the audio signals of the participating parties in accordance to the conference scene and the temporal multipex established within the conference controller 111. The set of downstream audio signals 124 is also referred to herein as the multiplexed output audio signal. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120. A further example for the set of downstream audio signals 124 may be a multi-channel audio signal (e.g. a 5.1 or a 7.1 audio signal) or an ambisonic signal (e.g. a first-order ambisonic signal in B-format) representing a soundfield. In these cases, the spatial information regarding the talker locations is directly encoded within the set of downstream audio signals 124.

As such, the audio servers 112 may be configured to perform the actual signal processing (e.g. using a digital signal processor) of the plurality of upstream audio streams and/or the plurality of upstream audio signals, in order to generate the plurality of downstream audio streams and/or the plurality of downstream audio signals, and/or the metadata describing the conference scene. The audio servers 112 may be dedicated to a corresponding terminal 120 (as illustrated in FIG. 1a). Alternatively, an audio server 112 may be configured to perform the signal processing for a plurality of terminals 120, e.g. for all terminals 120.

The set of downstream audio signals 124 for a particular terminal 120 is generated from the plurality of upstream audio signals 123 using the central conference controller 111 and the audio server 112, e.g. the audio server 112 (or the processing module or the software thread) for the particular terminal 120. The central conference controller 111 and the audio server 112 generate an image of the 2D or 3D conference scene as it is to be perceived by a conference participant at the particular terminal 120 (also taking into account the temporal multiplexing applied for the particular terminal 120). If there are M terminals 120 connected to the conference server 110, then the conference server 110 may be configured to arrange M groups of (M-1) upstream audio signals 123 within M 2D or 3D conference scenes (M being an integer with M>2, e.g. M>3, 4, 5, 6, 7, 8, 9, 10). More precisely, the conference server 110 may be configured to generate M conference scenes for the M terminals 120, wherein for each terminal 120 the remaining (M-1) other upstream audio signals 123 are arranged within a 2D or 3D conference scene. In a similar manner, the remaining (M-1) other upstream audio signals 123 are temporally multiplexed into the set of downstream audio signals 124 (i.e. into the multiplexed output audio signal) for the particular terminal 120

A terminal 120 receives its terminal specific set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and/or the corresponding metadata. Alternatively or in addition, the terminal 120 may be configured to process ambisonic signals, in order to render a soundfield. In an embodiment, the audio processing unit 121 of the terminal 120 is configured to generate a mixed binaural audio signal for rendering by the audio transceiver 122, wherein the mixed binaural audio signal reflects the terminal specific conference scene designed at the conference server 110 for this terminal 120. By way of example, the audio processing unit 121 may be configured to analyze the received metadata and to place the received set of downstream audio signals 124 into the terminal specific conference scene. Alternatively, the audio processing unit 121 may process the received ambisonic signal. As a result, the conference participant perceives a binaural audio signal which gives the conference participant at the terminal 120 the impression that the other participants are placed at specific locations within a conference scene.

The generation of a binaural audio signal for the set of downstream audio signals 124 may be performed by processing each (mono) downstream audio signal through a spatialisation algorithm. Such an algorithm could be the filtering of the samples of the downstream audio signal using a pair of head related transfer functions (HRTFs), in order to provide a left and right ear signal. The HRTFs describe the filtering that would have naturally occurred between a sound source (of the downstream audio signal) positioned at a particular location in space and the ears of the listener. The HRTFs include all the cues for the binaural rendering of the sound, such as interaural time difference, interaural level difference and spectral cues. The HRTFs depend on the location of the sound source (i.e. on the talker location of the downstream audio signal). A different, specific pair of HRTFs may be used for each specific location within the conference scene. Alternatively, the filtering characteristics for a particular location can be created by interpolation between adjacent locations that HRTFs are available for. Hence, the terminal 120 may be configured to identify the talker location of a downstream audio signal from the associated metadata. Furthermore, the terminal 120 may be configured to determine an appropriate pair of HRTFs for the identified talker location. In addition, the terminal 120 may be configured to apply the pair of HRTFs to the downstream audio signal, thereby yielding a binaural audio signal which is perceived as coming from the identified talker location. If the terminal 120 receives more than one downstream audio signal within the set of downstream audio signals 124, the above processing may be performed for each of the downstream audio signals and the resulting binaural signals may be overlaid, to yield a combined binaural signal. In particular, if the set of downstream audio signals 124 comprises an ambisonic signal representing a soundfield, the binaural processing may be performed for some or all components of the ambisonic signal.

By way of example, in case of first order ambisonic signals, signals originating from mono endpoints may be panned into respective first order ambisonic (WXY) soundfields (e.g. with some additional reverb). Subsequently, all soundfields may be mixed together (those from panned mono endpoints, as well as those from soundfields captured with microphone arrays), thereby yielding a multiplexed soundfield. A WXY-to-binaural renderer may be used to render the multiplexed soundfield to the listener. Such a WXY-to-binaural renderer typically makes use of a spherical harmonic decomposition of HRTFs from all angles, taking the multiplexed WXY signal itself (which is a spherical harmonic decomposition of a soundfield) as an input.

It should be noted that alternatively or in addition to the generation of a mixed binaural audio signal, the terminal 120 (e.g. the audio processing unit 121) may be configured to generate a surround sound (e.g. a 5.1 or a 7.1 surround sound) signal, which may be rendered at the terminal 120 using appropriately placed loudspeakers 122. Furthermore, the terminal 120 may be configured to generate a mixed audio signal from the set of downstream audio signals 124 for rendering using a mono loudspeaker 122. Furthermore, the terminal 120 may be configured to generate a crosstalk-cancelled binaural rendering from the set of downstream audio signals suitable for playback over a pair of loudspeakers placed in front of the listener.

FIG. 1a illustrates a 2D or 3D conference system 110 with a centralized architecture. 2D or 3D audio conferences may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

In a distributed architecture, a terminal 170 is configured to send its upstream audio signal 173 (e.g. as a bitstream) to the other participating terminals 170 via a communication network 160. The terminal 170 may be a monophonic or a soundfield terminal. The terminal 170 may use multicasting schemes and/or direct addressing schemes of the other participating terminals 170. Hence, in case of M participating terminals 170, each terminal 170 receives up to (M-1) downstream audio signals 174 (e.g. as bitstreams) which correspond to the upstream audio signals 173 of the (M-1) other terminals 170. The local conference controller 175 of a receiving terminal 170 is configured to place the received downstream audio signals 174 into a 2D or 3D conference scene (and/or to perform the spatial multiplexing strategies described in the present document), wherein the receiving terminal 170 (i.e. the listener at the receiving terminal 170) is typically placed in the center of the conference scene. In the context of FIG. 1b, the downstream audio signals 174 may be considered to be the input audio signal for the spatial multiplexer. The audio processing unit 171 of the receiving terminal 170 may be configured to generate a mixed binaural signal from the received downstream audio signals 174, wherein the mixed binaural signal reflects the 2D or 3D conference scene (including the spatial multiplexing) designed by the local conference controller 175. The mixed binaural signal may then be rendered by the audio transceiver 122. Alternatively or in addition, the audio processing unit 171 of the receiving terminal 170 may be configured to generate a surround sound signal to be rendered by a plurality of loudspeakers.

In an embodiment, the mixing may be performed in the ambisonic domain (e.g. at a central conference server). As such, the downstream audio signal to a particular terminal comprises a multiplexed ambisonic signal representing the complete conference scene. Decoding to binaural headphone feeds or to loudspeaker feeds may be done at the receiving terminal as a final stage.

It should be noted that the centralized conference system 100 and the decentralized conference system 150 may be combined to form hybrid architectures. By way of example, the terminal 170 may also be used in conjunction with a conference server 110 (e.g. while other users may use terminals 120). In an example embodiment, the terminal 170 receives a set of downstream audio signals 124 (and corresponding metadata) from the conference server 110. The local conference controller 175 within the terminal 170 may set up the conference scene provided by the conference server 110 as a default scene. In addition, a user of the terminal 170 may be enabled to modify the default scene provided by the conference server 110.

In the following, reference will be made to the centralized conference architecture 100 and terminal 120. It should be noted, however, that the teachings of this document are also applicable to the de-centralized architecture 150, as well as to hybrid architectures.

As such, the present document is directed at a voice conferencing system 100 for which a range of different input audio endpoints 120, 170 are envisaged. These endpoints 120, 170 include multi-channel spatial sound capture devices 184, mono microphones and headsets 183, legacy PSTN/VoIP/SIP/mobile clients 185 and potentially auxiliary soundfields and spatial audio from other mixer hierarchies 182 or cued media such as recorded content or messaging and prompting (e.g. Interactive Voice Response 181) (see FIG. 1c).

Such a conference system 100 manages multiple endpoints that can provide audio signals in some spatial format, or simple mono audio signals. Without any loss of generality, the spatial sound or soundfield formats are noted as a single type, noting that generally there are appropriate mappings and transforms between such multi-channel audio representations.

Thus in this document, soundfield and spatial sound are used interchangeably. A schematic of the full spatial conferencing system is shown in FIG. 1c. A conference multiplexer 190 (e.g. the central server 110 of FIG. 1a or the local conference controller 175/audio processing unit 171 of FIG. 1b) has knowledge of the relevant spatial and mono audio streams in the conference, and operates to reduce the input spatial audio streams into a single soundfield representation.

In the example system 100, at one or more endpoints a rendering operation 192 is performed which involves the typical combination of a single soundfield and a set of mono inputs. In an embodiment, this rendering is carried out on an endpoint 120, however, the rendering may be performed at any stage in the system 100. The present document is related to the algorithms and techniques used to achieve the multiplexing operation on the soundfields within the conference multiplexer 190 and/or the soundfield conference multiplexer 191. FIG. 1c is presented without any loss of generality in that the server and endpoint components may be distributed or combined and in that the communication network may be realized as a direct software or inter-process link. In particular, aspects of the rendering and other signal to combinations may be rearranged across the system and network. The present document is not limited by the actual structure of the conference system 100 and rather relates to the selection and the mixing of multiple soundfields to create a single soundfield which is to be presented to the listener at a particular endpoint. In the present document, the selection and mixing is represented as a functional block in the central server, however, it should be apparent to one skilled in the art that an equivalent functionality could be performed by forwarding the plurality of component soundfields with appropriate constructs and to achieve the desired mixing downstream (e.g. at a terminal 170 as illustrated in FIG. 1b).

The following various schemes for temporal multiplexing of a plurality of soundfields are described. In particular, different multiplexing strategies are described in the following. These multiplexing strategies may be used by the conference multiplexer 190 (in particular by the soundfield multiplexer 191) to determine a multiplexed output soundfield signal from a plurality of input soundfield signals (and possibly additional input mono signals).

Multiplexing Strategy "Most Recent Talker"

A first variant of the multiplexing strategy "Most Recent Talker" may make use of the following one or more rules:

1. Whenever an endpoint has its talk flag set (i.e. presence of talk activity), its audio (i.e. the corresponding input audio signal) will be mixed into the resulting soundfield (i.e. the multiplexed output audio signal) heard by all other endpoints. Typically, an upstream audio signal 123 coming from an endpoint 120 is segmented in a sequence of frames (e.g. of 20 ms of length). The conference multiplexer 190 may monitor the upstream audio signal 123 and perform voice activity detection (VAD) on a frame by frame basis, thereby classifying the frames into voice frames and non-voice frames. The talk flag may be set for a frame of the upstream audio signal 123 when the frame is classified to be a voice frame. Otherwise, the talk flag may be reset.

2. If no endpoint currently has its talk flag set, only that endpoint which most recently had its talk flag set will be heard by all other endpoints. If there is a tie for the endpoint with most recent talk activity, the tie may be broken using a decision strategy (such as choosing a first in the server's list of endpoints).

A second variant of the multiplexing strategy "Most Recent Talker" may be referred to as the "Most Recent Soundfield Talker" strategy and may make use of the following one or more rules:

1. Whenever an endpoint has its talk flag set, its audio (i.e. the corresponding input audio signal) will be mixed into the resulting soundfield (i.e. the multiplexed output audio signal) heard by all other endpoints.

2. If no endpoint currently has its talk flag set, only that soundfield endpoint which most recently had its talk flag set will be heard by all other endpoints (i.e. will be multiplexed into the multiplexed output audio signal). If there is a tie for the soundfield endpoints with most recent talk activity, the tie may be broken using a decision strategy (such as choosing the first in the server's list of endpoints).

The noted difference of the "Most Recent Soundfield Talker" strategy with respect to the "Most Recent Talker" strategy is that in the "Most Recent Soundfield Talker" strategy, a soundfield will continue to be present, even when a mono endpoint continues to dominate the conference. In other words, even at time instants when only mono endpoints are active, an inactive soundfield (in particular, the most recent inactive soundfield) will be mixed into the output signal to provide for the impression of a continuous ambience.

It can be observed that the "Most Recent Soundfield Talker" scheme has the following properties:

When nobody is talking (i.e. none of the input audio signals has talk activity), the ambience of exactly one soundfield is heard at each endpoint. This means that the amount of ambient noise does not appear to increase as more soundfield endpoints are added to the conference under normal conversational conditions where one person talks at any one time. As such, the background noise in audio conference systems can be reduced.

A listener will not hear a switch from the soundfield of one endpoint to that of another endpoint in-between talk bursts, which might sound perceptually discontinuous since each soundfield may contain characteristic cues such as different noise and reverberation profiles. In other words, the switching between different soundfields is reduced, thereby reducing audible artifacts.

Under normal conversational conditions, a listener (of the multiplexed output audio signal) will not hear a switch from one endpoint's soundfield to that of another endpoint unless accompanied by speech onset. This helps a listener to associate a talker with a particular characteristic soundfield ambience, providing context as to at which endpoint a talker is located.

The switch in the background soundfield is also perceptually masked by the event and signal activity associated with the onset of speech.

Figure 2:
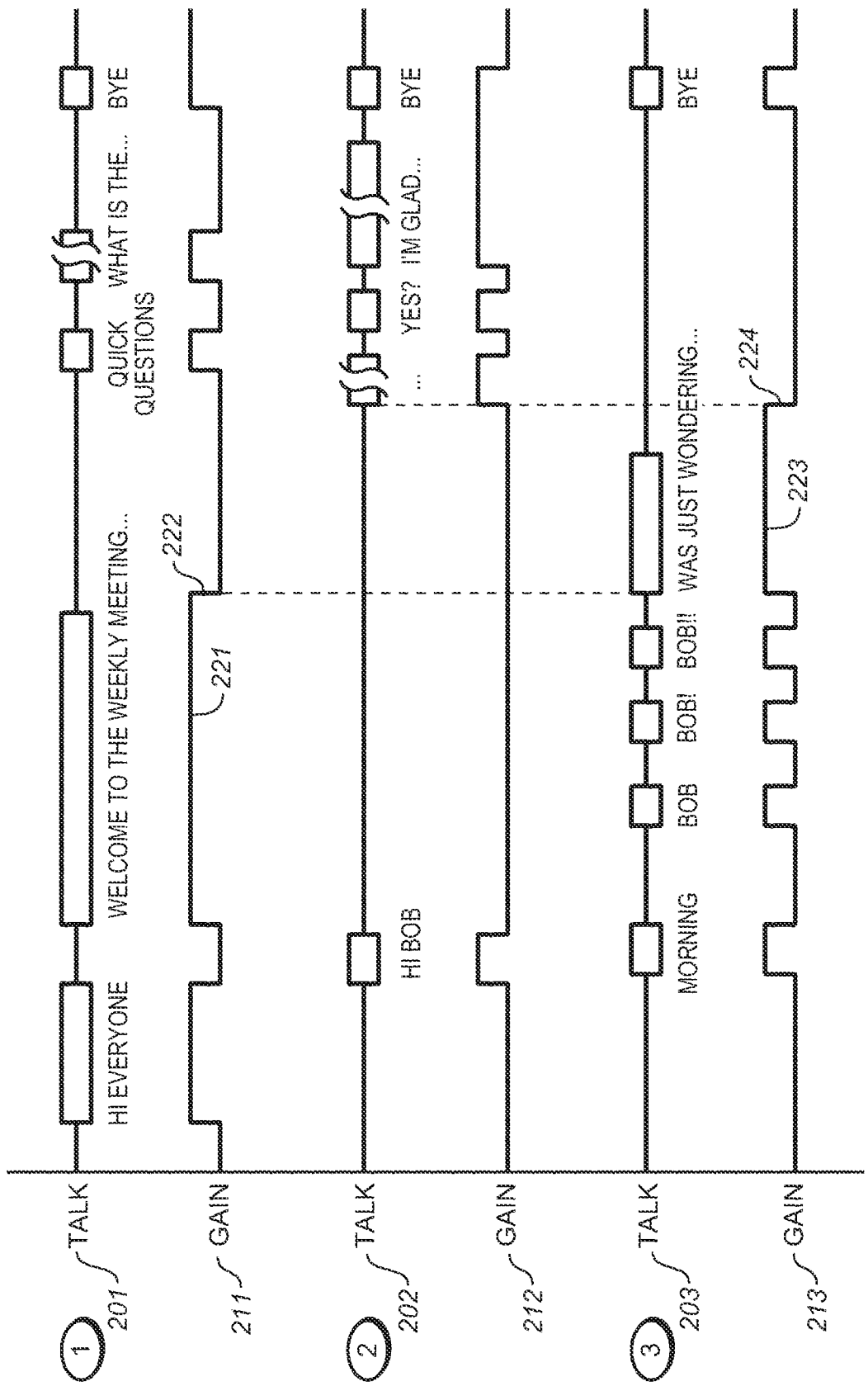
FIGS. 2 to 7 illustrate different mixing strategies.

FIG. 2 illustrates the "Most Recent Talker" Strategy for the case of three talkers 201, 202, 203 at different endpoints and the gain 211, 212, 213 associated with the talkers 201, 202, 203. It can be seen that at time instant 221, the talker 201 is the last talker, and the gain 211 is maintained. In a similar manner at time instant 223, the talker 203 is the last talker and the gain 213 is maintained. On the other hand, as soon as a taker becomes active, the respective gain of the non-active talker is put to zero (see time instants 222 and 224).

In an example, the gain $g_i(t)$ which is applied for an input soundfield signal (i.e. to an input audio signal) from endpoint i, when multiplexing the input soundfield signal into the multiplexed output soundfield signal (i.e. to the multiplexed output audio signal) may be given by the following equation:

$$g_i(t) = \begin{cases} 1, & \text{if } \sum_i T_i(t) = 0 \text{ and } g_i(t-1) = 1 \\ 0, & \text{if } T_i(t) = 0 \text{ and } \exists g_j = 1, \text{ for } j < i \\ T_i, & \text{otherwise} \end{cases}$$

where
  $T_i(t)$ is the talk flag for endpoint i at time t
  $g_i(t)$ is the gain for endpoint i at time t.

For the sake of discussion and in preferred embodiments, the voice is processed in discrete blocks or frames of audio samples or time. Such blocks may have a length in the range from 5-100 ms in practical conferencing systems (e.g. 20 ms). The equations presented are evaluated at these discrete times, denoted t, corresponding to numbered audio frames of the set length. In other words, the parameter t may identify a frame of the input soundfield signal (i.e. of the input audio signal).

Multiplexing Strategy "Most Recent Talker with Hold"

The above presented "Most Recent Talker" strategy has low computational complexity, however, in some situations this strategy may lead to an excessive switching or alternation of the soundfields (i.e. of the input audio signals) which are linked within the audio conference system. Whilst this typically only occurs where there is associated sporadic speech activity, an excessive switching or alternation may become a distraction. In an extension to the "Most Recent Talker" strategy shown in FIG. 3, a hold-off time (i.e. a hold time interval) may be added. In particular, the gain $g_i(t)$ with which a soundfield endpoint i is mixed may be held high for some time after the conditions of the above mentioned "Most Recent Talker" scheme cease to exist.

For one embodiment, the following algebraically expression is applied:

$$s_i(t) = \begin{cases} 1, & \text{if } \sum_i T_i(t) = 0 \text{ and } s_i(t-1) = 1 \\ 0, & \text{if } T_i(t) = 0 \text{ and } \exists s_j = 1, \text{ for } j < i \\ T_i, & \text{otherwise} \end{cases}$$

$$g_i(t) = \begin{cases} 1, & \text{if } \left\{\sum_{\tau=t-h}^{t} s_i(\tau)\right\} > 0 \\ 0, & \text{otherwise} \end{cases}$$

where additionally
  $s_i(t)$ is a state variable for endpoint i at time t
  h is the hold-off time (i.e. the hold time interval).

Figure 3:
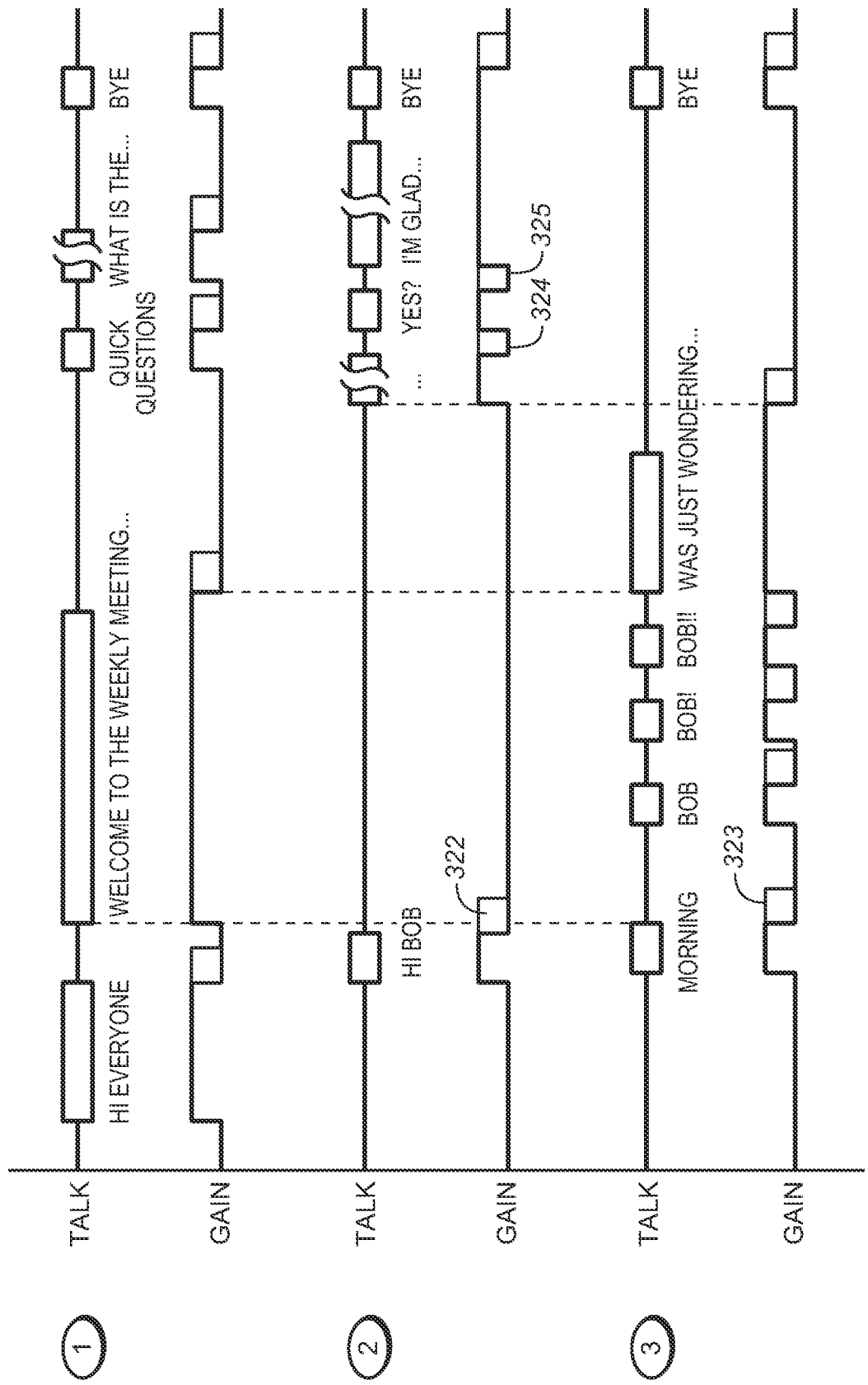

As can be seen in FIG. 3, this hold over can reduce the gating in and out of specific soundfields (i.e. input audio signals) at points where there is some short simultaneous activity from multiple endpoints (see e.g. reference numerals 322 and 323). In particular, it can be seen that the gain for short talk bursts can be filled by the addition of the hold time interval, so that the resulting conference scene is more perceptually continuous (see e.g. reference numerals 324, 325).

Multiplexing Strategy "Most Recent Talker with Hold and Fade"

Figure 4:
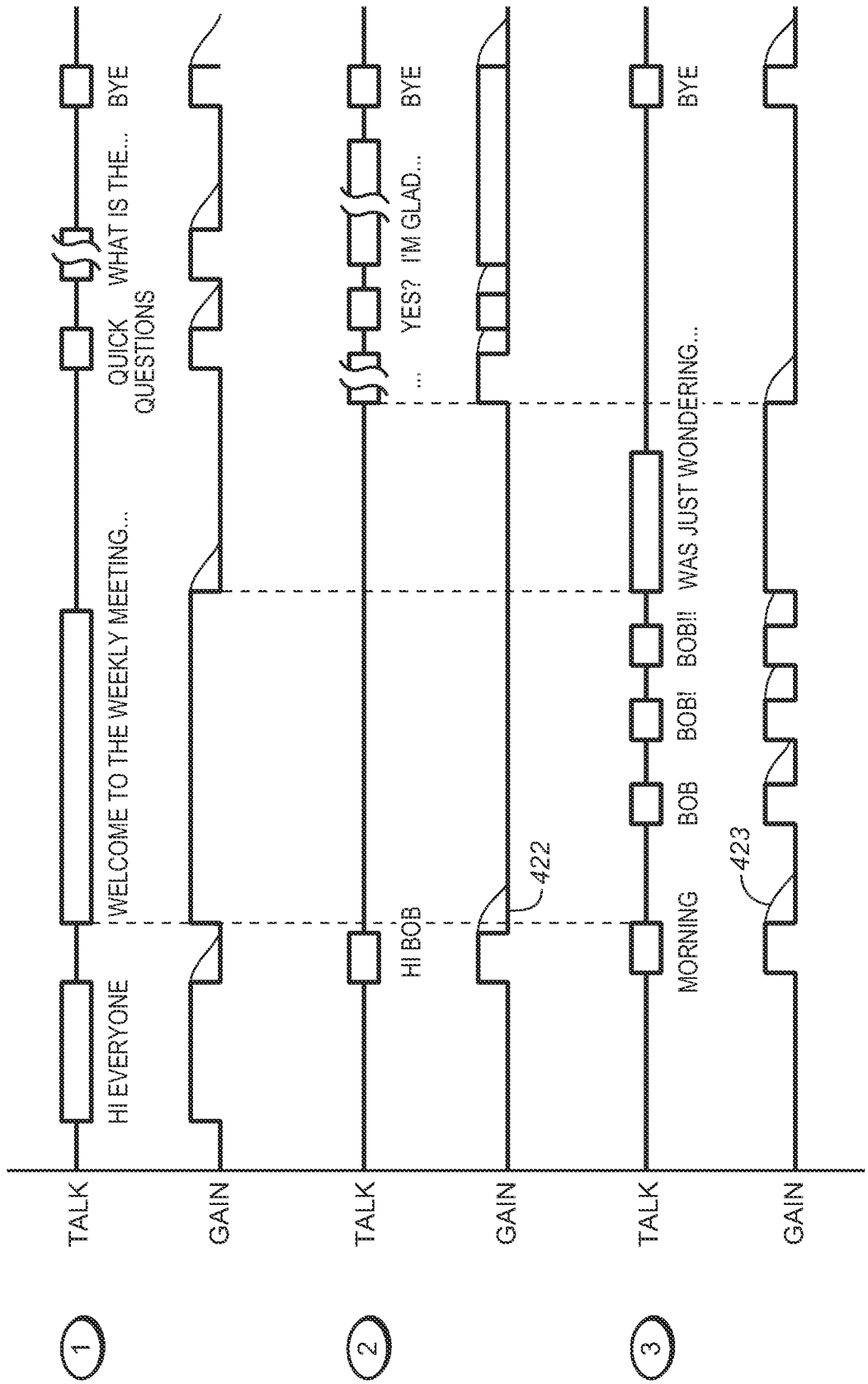

In a further extension to the "Most Recent Talker" strategy illustrated in FIG. 4, a hold-off time and fade-out may be added, whereby the gain $g_i(t)$ with which a soundfield endpoint i is mixed is held high for some time after the conditions in the "Most Recent Talker" strategy cease to exist. After the hold period (i.e. after the hold time interval) the gain $g_i(t)$ fades down slowly, thereby avoiding distinct switching time instants, i.e. thereby reducing the audible artifacts to due switching. In other words, the application of a fade out reduces some aspects of the sharp soundfield switching, although it can lead to a larger number of soundfields present at any specific time, especially after a simultaneous activity event across the endpoints. The fade-out time (i.e. the fade-out time interval) is generally short, e.g. in the order of 20-100 ms.

In an example, the following expressions for the gain $g_i(t)$ may be used to implement the mix presence and fade out of the soundfield signal i:

$$s_i(t) = \begin{cases} 1, & \text{if } \sum_i T_i(t) = 0 \text{ and } s_i(t-1) = 1 \\ 0, & \text{if } T_i(t) = 0 \text{ and } \exists s_j = 1, \text{ for } j < i \\ T_i, & \text{otherwise} \end{cases}$$

$$H_i(t) = \begin{cases} 1, & \text{if } \left\{\sum_{\tau=t-h}^{t} s_i(\tau)\right\} > 0 \\ 0, & \text{otherwise} \end{cases}$$

$$g_i(t) = f(H_i(t), g_i(t-1))$$

where
  h is the hold-off time; and
  f(s,g) describes how the fade occurs as a function of the held state and the previous gain.

An example for the fade-out function is:

$$f(s,g) = \max(s, g\alpha)$$

where
  $\alpha$ is a decay time constant in (0, 1) representing a fade out time (i.e. a fade-out time interval); a fade-out time interval of 0.1 ... 10 s (e.g. 2 s) has been found to be useful.

An example for a hold and fade-out strategy is illustrated in FIG. 4, where it can be seen that the hold periods 322, 323 of FIG. 3 are combined with an additional fade-out (see reference numerals 422, 423 of FIG. 4).

Verbosity Based Multiplexing Strategy

The previous strategies present approaches to managing the selection and the transition of input soundfield signals (i.e. input audio signals to generating the multiplexed output soundfield signal (i.e. the multiplexed output audio signal).

In the following, an extension to these strategies is described, which is based on the accumulation of a state variable for each endpoint. The state variable may be maintained by the conference multiplexer 190, or at an entity within the conferencing system where there is central information about all (M−1) participants of the particular conference (e.g. at the terminal 170 in FIG. 1b). The state variable described in the present document is indicative of a degree of activity, importance or participation in the conference. Without loss of generality, the state variable is referred to herein as 'verbosity'. It is proposed to accumulate the 'score' or 'verbosity' of each input soundfield signal over time, thereby yielding verbosity values $V_i$ for the input soundfield signals of each endpoint i. The verbosity values $V_i$ may be modified depending on the activity in the conference. The set of verbosity values $V_i$ may be used to define multiplexing strategies that extend the multiplexing strategies presented previously.

Without loss of generality, the verbosity $V_i$ may be defined in an example as a measure ranging between 0 and 1 with any update saturating at either extreme. A relatively high value of $V_i$ indicates that the endpoint i has been more active, and thus is more likely or suitable to be sustained as a recently active soundfield in the multiplexed output soundfield signal. The verbosity measure $V_i$ is modified at each frame or time instant according to a set of rules and parameters. Example rules and parameters are listed in Table 1. In particular, Table 1 illustrates mechanisms and suggested changes to the verbosity measure.

TABLE 1

| Symbol | Description | Range | Suggested |
|---|---|---|---|
| $h_v$ | Hold time before increasing V when activity commences | 0 ... 2 s | 200 ms |
| $h_n$ | Hold time before decreasing V when activity ceases | 0 ... 10 s | 500 ms |
| $p_v$ | Increase to V when active beyond the hold time $h_v$ | 0 ... 1 | +0.05/s |
| $p_s$ | Increase to V when endpoint is the only active endpoint beyond the hold time $h_v$ | 0 ... 1 | +0.1/s |
| $m_v$ | Decrease to V not active beyond the hold time $h_n$, when a plurality of other endpoints is active | 0 ... 1 | −0.1/s |
| $m_s$ | Decrease to V not active beyond the hold time $h_n$, when exactly one other endpoint is active | 0 ... 1 | −0.4/s |
| $m_0$ | Decrease to V not active beyond the hold time $h_n$, when no other endpoints are active | 0 ... 1 | 0.0/s |

Generally, from the above set of parameters, verbosity $V_i$ for an endpoint i is increased when the endpoint i is active, and increased faster if endpoint i is the only active endpoint. Verbosity $V_i$ is decreased when the endpoint i is inactive, and at least one other endpoint is active. Verbosity $V_i$ is decreased faster if there is only one active endpoint. In the case of no activity in the conference, a suggestion is to maintain the present verbosity levels. In some embodiments, it may be preferable to apply an appropriate decay of the Verbosity $V_i$ and link the decay to a fading-out of the associated soundfield signal of endpoint i.

Figure 5:
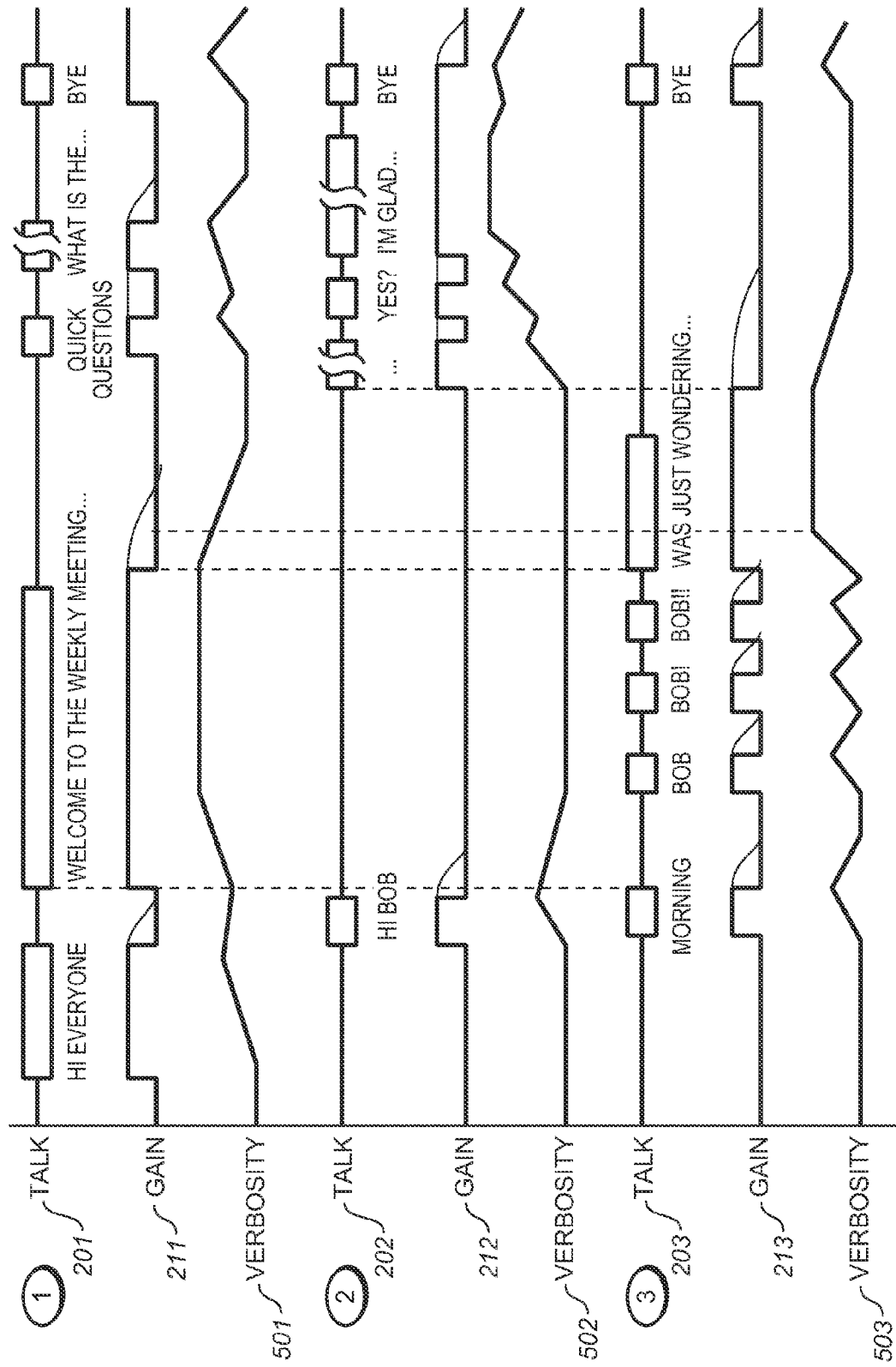

FIG. 5 illustrates the mechanisms and variations of the verbosity measure across an example conference scenario. In a similar manner to FIGS. 2 to 4, the talk activities 201, 202, 203 and the gains 211, 212, 213 for three endpoints are illustrated. Furthermore, example verbosity measures 501, 502, 503 (or verbosities, in short) are illustrated for the three endpoints. It can be seen that the verbosity measures 501, 502, 503 increase/decrease in dependence on the (relative) talk activity 201, 202, 203 of the endpoints (e.g. using the rules and parameters listed in).

When tracking the verbosity Vi 501, 502, 503 for the endpoints, a gain function $g_i(t)$ may be defined, which is related to the verbosity value. In an example, the following gain function may be used:

$$g_i = \begin{cases} 1 & T_i > 0 \text{ or } V_i > 0.2 \text{ or } \forall j \neq i, V_i > V_j \\ 5V_i & V_i < 0.2 \\ 0 & V_i = 0 \end{cases}$$

As a result, input soundfield signals having a relatively high degree of talker activity may be held on for a longer time period than input soundfield signals having a relatively low degree of talker activity. This means that background noise (or ambience) originating from the input soundfield signals with a high degree of talker activity dominates the background noise (or ambience) of the conference during periods where no input soundfield signal is active. By doing this, the perceived continuity of the conference scene can be increased.

Verbosity Based Multiplexing Strategy with Reduced Contribution Gain

A further extension involves departing from the binary nature of an input soundfield signal being multiplexed into the multiplexed output soundfield signal. In particular, at any point in time, the contributing gains may be set and held constant such that $g_i(t) < 1$ even in the case that t $T_i(t) > 0$. By way of example, a constraint may be applied such that in the presence of multiple simultaneous talk activities, the soundfield contributions are reduced to a certain extent, in order to avoid a perceived increase in the background soundfield level. In other words, it is proposed to make the gains $g_i(t)$ which are applied to the input soundfield signals dependent on the number of concurrently active input soundfield signals. By doing this, it can be ensured that the background noise level does not exceed a pre-determined level, even for an increasing number of concurrently active input soundfield signals. In order to achieve this, the total gain which may be distributed may be limited to a maximum level, e.g.

$$\Sigma_i g_i(t) < 1.5.$$

Furthermore, the gains $g_i(t)$ of each active endpoint may be related to the current verbosity $V_i$ of the endpoint. The gains $g_i(t)$ may then be scaled overall to achieve a constraint as above. By way of example, the gains $g_i(t)$ may be determined as:

$$g_i(t) = \frac{1 + V_i(t)}{2}; \text{ or}$$

$$g_i(t) = \frac{V_i(t)}{\Sigma V_i(t)}.$$

Figure 6:
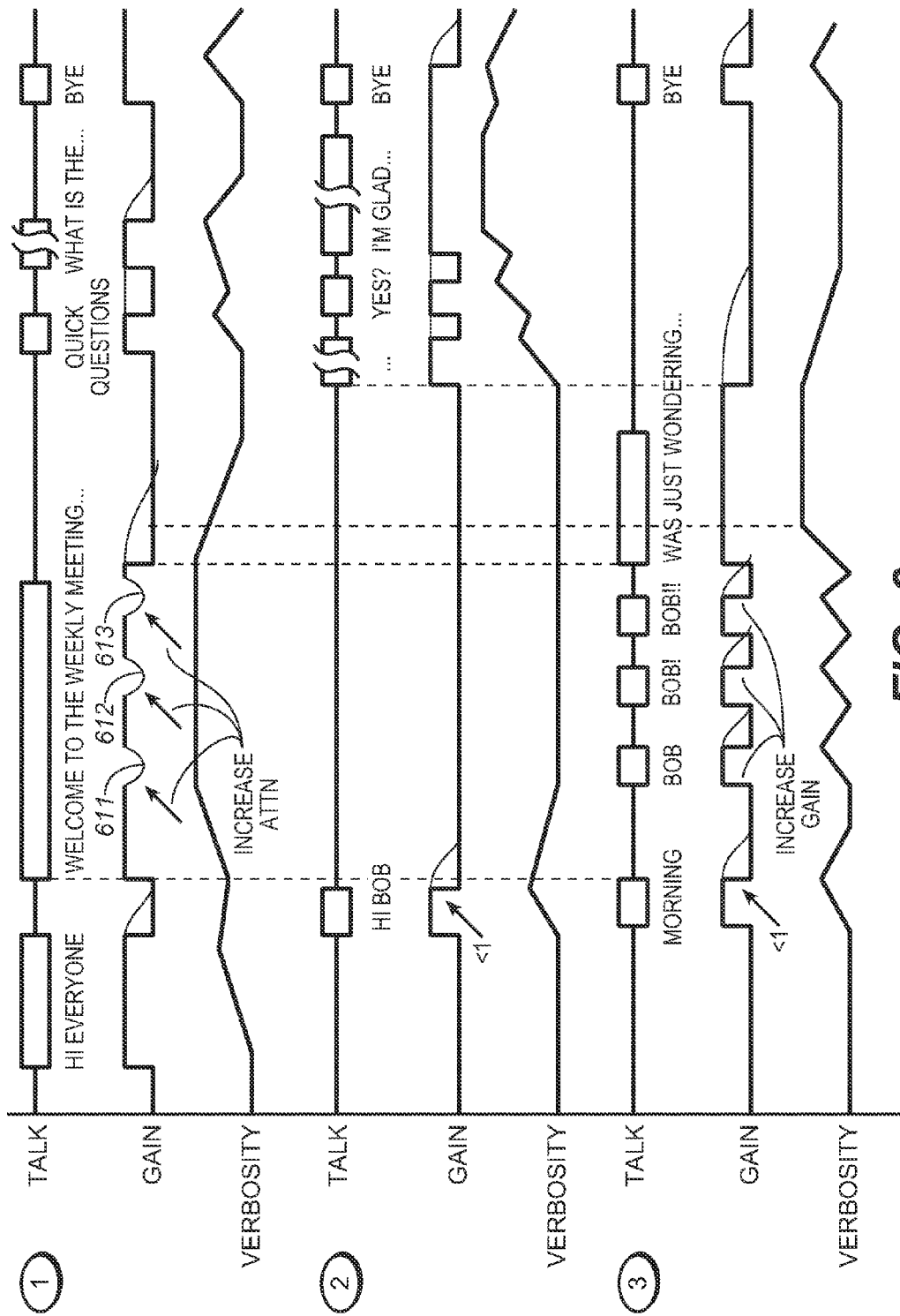

In this way, a relative gain difference of 6 dB may be achieved for each input soundfield signal based on the verbosity $V_i$. As can be seen from FIG. 6, this has the advantage of lowering the total level during activity collisions (e.g. at reference numerals 611, 612, 613), and reduces the level of the transition to a new dominant speaker.

Verbosity Based Multiplexing Strategy with Control of Noise Suppression

The previous strategy describes means of reducing the individual and overall gains based on the verbosities and concurrent soundfield activity. The present strategy presents an alternative or addition, where a residual soundfield is attenuated, so that the voice level remains constant and so that a target combined soundfield level is managed.

In particular, it is proposed to create a control signal $N_i(t)$ based on the verbosity $V_i$, which can control the effective depth of noise suppression applied to the input soundfield signal of the endpoint i. By way of example, this may be achieved by a control signal being sent upstream to the endpoint i, however, this may not suit the needs of all recipients of the input soundfield signal originating from endpoint i.

It is proposed in the present document, to vary an amount and/or a depth of noise suppression which is applied to an input soundfield signal based on the verbosity. The noise suppression which is applied to the input soundfield signal may be defined by a time and/or frequency dependent noise suppression profile $A_i(t,f)$ which is used to filter (attenuate) the input soundfield signal. The noise suppression profile $A_i(t,f)$ may be submitted to a scaling factor $N_i$ (t) which controls the amount and/or depth of noise suppression (e.g. $N_i$ (t)=0 yields no noise suppression, wherein $N_i$ (t)=1 yields default noise suppression).

The noise suppression profile $A_i(t,f)$ is typically applied to an input soundfield signal in order to achieve a certain degree of cleaning and removal of unwanted background and ambient content. The noise suppression profile $A_i(t,f)$ may be indicative of a gain profile which determines time and frequency varying filtering, which in turn can achieve a functional outcome (e.g., an approximation of originally captured speech content without the corruption of noise, reverb, microphone limitations (sibilance) and distance or medium induced level variations). Such a noise suppression profile $A_i(t,f)$ may comprise a constructive instruction for obtaining a monophonic or soundfield audio signal representation on the basis of a raw signal. The constructive instruction may for instance comprise a gain to be applied to each of different frequency bands of the monophonic signal or soundfield signal. Alternatively, the noise suppression profile $A_i(t,f)$ may determine a broadband gain (which may implement aspects of dynamic range control or phrasing in accordance with utterances), or a frequency-variable gain profile (which may clean frequency components that are expected to convey sound other than speech or apply some frequency and time varying filter that may have otherwise been applied at the time of the input audio processing to arrive at a desired mono output for a particular purpose).

Suitable noise suppression profiles $A_i(t,f)$ may be calculated at the point of input and encoding (e.g. at an originating endpoint 120, 170), and sent along with the upstream audio signals 123 as associated metadata, or alternately, if the full audio signal is sent to the server or point of processing (as typically is the case in the present document), a suitable calculation of the noise suppression profile $A_i(t,f)$ may occur at this point. In a particular embodiment, it is advantageous to perform the analysis and indication of the noise suppression profile $A_i(t,f)$ at the input client (i.e. at the originating endpoint 120, 170) for reasons of scalability, additional information and in particular for the possibility of the audio not being fully decoded in the process of multiplexing (as performed by the conference multiplexer 190 described in the present document).

The noise suppression profile $A_i(t,f)$ may be determined based on the input soundfield signal using frequency analysis over a period of time (e.g. 1-2 seconds), thereby providing an approximation of the stationary or constant background noise. Example schemes for determining a noise suppression profile are described in Martin, R. (1994). Spectral Subtraction Based on Minimum Statistics. EUSIPCO 1994, and Martin, R. "Noise power spectral density estimation based on optimal smoothing and minimum statistics," *Speech and Audio Processing, IEEE Transactions on*, vol. 9, no. 5, pp. 504-512, July 2001, the content of which is incorporated by reference.

The patent application 61/703,857 filed 21 Sep. 2012, sets out an approach for achieving an efficient partial application of a pre-computed noise suppression spectral envelope to provide a parametrizable noise suppression. The content of this patent application is incorporated by reference.

Figure 7:
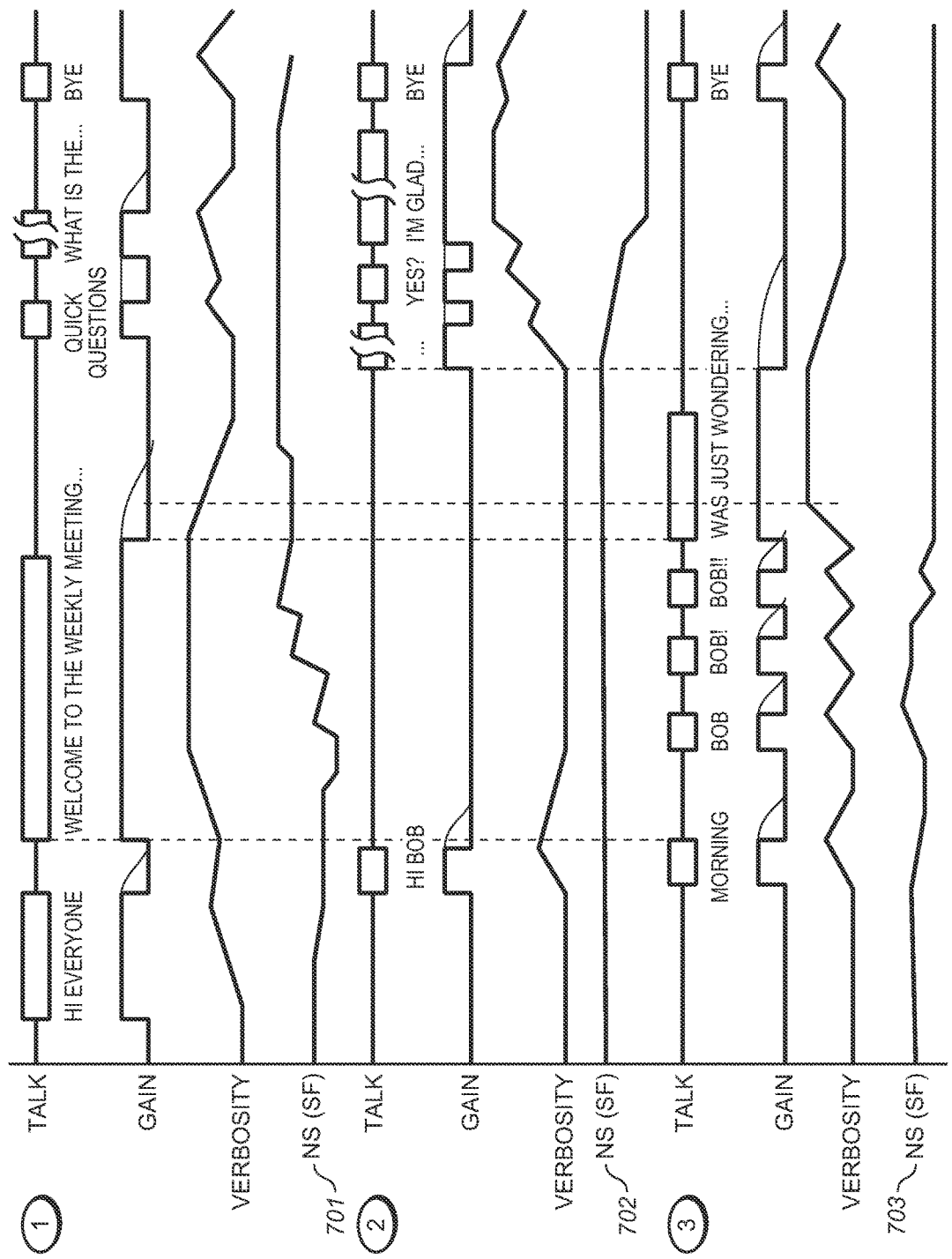

FIG. 7 is indicative of example noise suppression signals 701, 702, 703 (indicative of the evolution of noise suppression over time). The noise suppression signals 701, 702, 703 at a particular time instant may be obtained by submitting a default—signal dependent—noise suppression profile Ai(t,f) to a—verbosity dependent—scaling factor $N_i$ (t). The default noise suppression profile Ai(t,f) may be taken from metadata which is associated with the corresponding input soundfield signal or it may be determined by the conference multiplexer 190.

The extent of noise suppression may depend on the verbosity of the input soundfield signal. In particular, the extent of noise suppression may decrease with increasing verbosity. By way of example, the degree of noise suppression may be determined as:

$$N_i(t) = 1 - V_i(t); \text{ or}$$

$$N_i(t) = 1 - \frac{V_i(t)}{\Sigma V_i(t)}.$$

The above mentioned temporal multiplexing strategies are particularly well suited for the multiplexing of soundfield signals. It should be noted, however, that the temporal multiplexing strategies are also applicable to monophonic signals. As such, the disclosure of the present document is also applicable to monophonic input audio signals.

In the present document, various schemes for performing temporal multiplexing of monophonic and/or soundfield signals within a multi-party conference system have been described. The schemes may be used to reduce the level of background noise introduced into a conference scene due to the presence of one or more monophonic and/or soundfield signals. Furthermore, the schemes may be used to increase the perceived degree of continuity and/or to reduce disturbing switching artifacts within the conference scene.

The methods and systems described in the present document may be implemented as software, firmware and/or hardware. Certain components may e.g. be implemented as software running on a digital signal processor or microprocessor. Other components may e.g. be implemented in hardware, for example, as application specific integrated circuits or inside one or more field programmable gate arrays. The signals encountered in the described methods and systems may be stored on media such as random access memory or optical storage media. They may be transferred via networks, such as radio networks, satellite networks, wireless networks or wired networks, e.g. the Internet, a corporate LAN or WAN. Typical devices making use of the methods and systems described in the present document are portable electronic devices or other consumer equipment which are used to store and/or render audio signals.

The invention claimed is:

1. A method for multiplexing a first and a second continuous input audio signal to yield a multiplexed output audio signal which is to be rendered to a listener; wherein the first and second input audio signals are indicative of sounds captured by a first and a second endpoint, respectively; the method comprising determining a talk activity in the first and second input audio signals, respectively; and determining the multiplexed output audio signal based on the first and/or second input audio signals and subject to at least three multiplexing conditions;

wherein the at least three multiplexing conditions comprise:

at a time instant when there is talk activity in the first input audio signal, determining the multiplexed output audio signal at least based on the first input audio signal;

at a time instant when there is talk activity in the second input audio signal, determining the multiplexed output audio signal at least based on the second input audio signal; and at a silence time instant, when there is no talk activity in the first and in the second input audio signals, determining the multiplexed output audio signal based on only one of the first and second input audio signals.

2. The method of claim 1, wherein determining the multiplexed output audio signal comprises applying a first time-dependent to the first input audio signal, to yield a first weighted audio signal; wherein the first gain is greater than zero, at time instants when there is talk activity in the first input audio signal;

applying a second time-dependent gain to the second input audio signal, to yield a second weighted audio signal; wherein the second gain is greater than zero, at time instants when there is talk activity in the second input audio signal; and determining the multiplexed output audio signal based on the first and second weighted audio signals.

3. The method of claim 2, wherein if it is determined that, at the silence time instant, the first input audio signal comprises a talk activity which is more recent than a last talk activity in the second input audio signal, then the second gain is zero.

4. The method of claim 1, wherein at a time instant, when there is talk in the second input audio signal and no talk activity in the first input audio signal, the first gain is zero.

5. The method of claim 2, wherein the first input audio signal is a first soundfield signal indicative of a soundfield captured by the first endpoint;

the second input audio signal is a mono signal;

at the silence time instant, the second gain is zero.

6. The method of claim 5, wherein the first soundfield signal comprises a multi-channel audio signal indicative of a direction of arrival of a sound signal coming from a talker at the first endpoint.

7. The method of claim 5, wherein the first soundfield signal comprises a first-order ambisonic input signal; wherein the first-order ambisonic input signal comprises an omnidirectional input channel and at least two directional input channels; wherein the at least two directional input channels are associated with at least two directions which are orthogonal with respect to one another.

8. The method of claim 1, wherein the first and second input audio signals comprise a sequence of segments;

the determining the talk activity, the determining the multiplexed output audio signal is performed on a segment by segment basis; and the silence time instant corresponds to a segment, for which the first and second input audio signals have no talk activity.

9. The method of claim 1, wherein at all time instants, when there is no talk activity in the first and in the second input audio signals, only one of the first and the second input audio signals is used to determine the multiplexed output audio signal.

10. The method of claim 3, further comprising determining a second silence time interval ranging from a time instant of the last talk activity in the second input audio signal up to a current time instant;

maintaining the second gain greater than zero, if the second silence time interval is smaller than a predetermined hold time interval.

11. The method of claim 10, further comprising determining that the second silence time interval is greater than the hold time interval; and progressively reducing the second gain within a fade-out time interval subsequent to the hold time interval.

12. The method of claim 3, further comprising determining a resumption of talk activity in the second input audio signal at a second time instant; wherein the second time instant is subsequent to the silence time instant;

setting the second gain to a value greater zero; and if the first input audio signal is a mono audio signal, setting the first gain to zero.

13. The method of claim 12, further comprising if the first input audio signal is a soundfield signal and if the second audio signal is a mono signal, maintaining the first gain greater than zero.

14. The method of claim 3, further comprising determining a resumption of talk activity in the second input audio signal at a second time instant; wherein the second time instant is subsequent to the silence time instant;

setting the second gain to a value greater than zero; and if the first input audio signal is a mono audio signal, maintaining the first gain greater than zero for a hold time interval starting from the second time instant and subsequently setting the first gain to zero.

15. The method of claim 1, wherein the method further comprises determining a first and a second verbosity for the first and second input audio signals, respectively; wherein the first and second verbosities are indicative of a degree of talk activity in a recent evaluation time interval in the first and second input audio signals, respectively; and the multiplexed output audio signal is also determined based on the first and second verbosities, respectively.

16. The method of claim 15, referring back to claim 2, wherein the first and second gains are determined based on the first and second verbosities, respectively.

17. The method of claim 13, further comprising applying noise suppression to the first input audio signal, using a first noise suppression profile; wherein the first noise suppression profile depends on the first verbosity.

18. The method of claim 17, further comprising determining a default noise suppression profile based on the first input audio signal; and scaling the default noise suppression profile based on the first verbosity to yield the first noise suppression profile.

19. The method of claim 1, wherein the multiplexed output audio signal is a soundfield signal to be rendered at a respective soundfield endpoint.

20. A conference multiplexer configured to multiplex a first and a second continuous input audio signal to yield a multiplexed output audio signal which is to be rendered to a listener; wherein the first and second input audio signals are indicative of sounds captured by a first and a second endpoint, respectively; wherein the conference multiplexer is configured to determine a talk activity in the first and second input audio signals, respectively; and determine the multiplexed output audio signal based on the first and/or second input audio signals and subject to at least three multiplexing conditions;

wherein the at least three multiplexing conditions comprise:

at a time instant when there is talk activity in the first input audio signal, determining the multiplexed output audio signal at least based on the first input audio signal;

at a time instant when there is talk activity in the second input audio signal, determining the multiplexed output audio signal at least based on the second input audio signal; and at a silence time instant, when there is no talk activity in the first and in the second input audio signals, determining the multiplexed output audio signal based on only one of the first and second input audio signals.

21. A conference multiplexer configured to multiplex a first and a second continuous input audio signal to yield a multiplexed output audio signal which is to be rendered to a listener; wherein the first and second input audio signals are indicative of sounds captured by a first and a second endpoint, respectively; wherein the conference multiplexer is configured to:

detect talk activity in the first input audio signals and the second input audio signals;

detect a silence time instant, when there is no talk activity detected in the first input audio signals or the second input audio signals; and determine the multiplexed output audio signal based on the first or second input audio signals, subject to one or more multiplexing conditions;

wherein the one or more multiplexing conditions comprise:

at a silence time instant, determining the multiplexed output audio signal based on only one of the first and second input audio signals.

* * * * *